Feb. 2, 1943.  T. S. MILLER  2,309,974
PACKING DEVICE
Filed Jan. 3, 1941
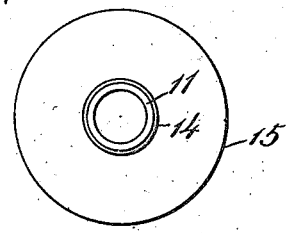
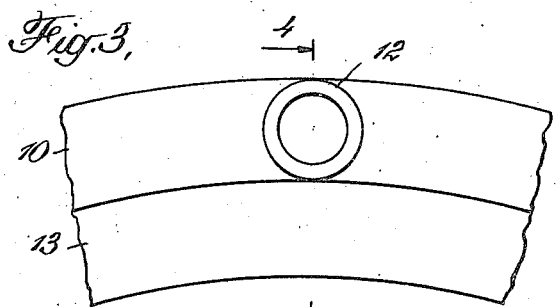
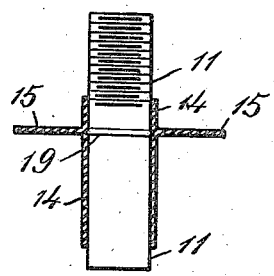
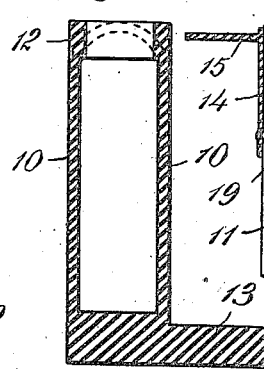
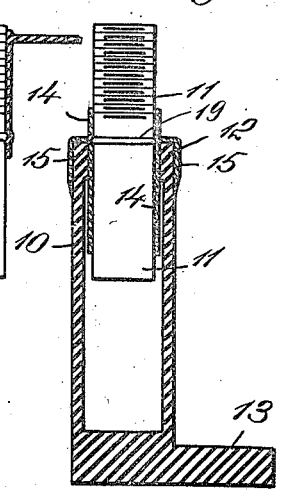
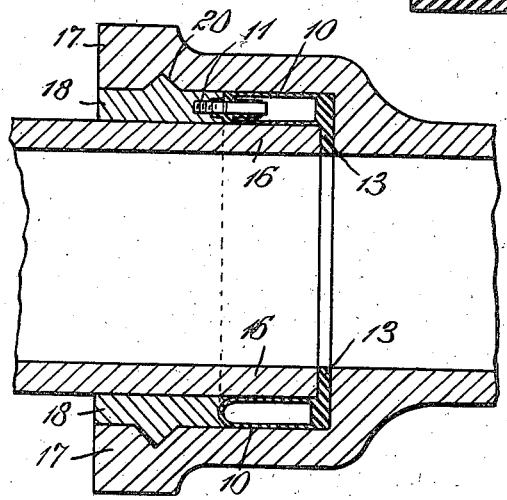
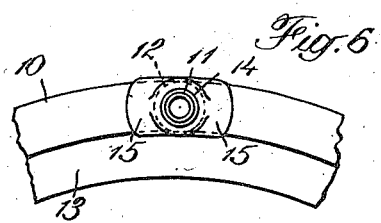
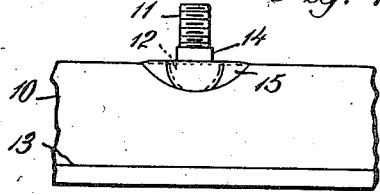
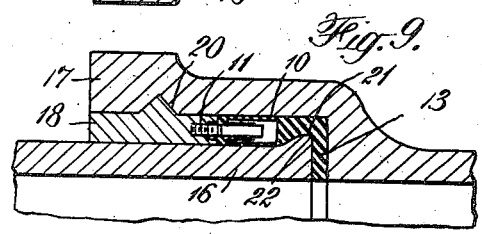
INVENTOR
Thomas S. Miller
BY
ATTORNEYS Patented Feb. 2, 1943

2,309,974

UNITED STATES PATENT OFFICE 2,309,974

PACKING DEVICE

Thomas S. Miller, Rome, N. Y., assignor to Water & Sewer Equipment Corporation, Rome, N. Y., a corporation of New York Application January 3, 1941, Serial No. 372,951

6 Claims. (Cl. 285—115)

This invention relates to packing devices for fluid delivery conduits and, more particularly, to bone-dry packing devices for water mains, and the like.

In the installation of extensions for municipal water mains, and in the repair of existing water mains, it is necessary permanently to seal the sections of pipe comprising the water main system. Fusible materials such, for example, as lead and similar substances of synthetic nature are used to obtain this permanent sealing. When it is desired to install an extension of an existing water main or to repair an existing system, the valves in that system must be closed during operations. However, it is characteristic of these valves that they will not completely stop the flow of water so that there is a constant flow of water, even though it may be only a trickle, into the line under construction or repair. The presence of this flow of water creates not only a serious hazard but also a mechanical obstacle. Molten lead connot be poured into the joint between the cylindrical or spigot end of one pipe section and the overlapping or bell-shaped end of an adjoining pipe section if any moisture is present within this joint because the steam generated by the molten lead produces an explosion which blows the molten mass back onto the workman. Furthermore, fusible materials other than lead require a bone-dry surface if a water-tight joint is to be obtained, and when the surfaces of the pipe comprising this joint are wet or even moist the resulting seal, after hardening of the fusible material, is imperfect and must be removed at the expense of considerable time and labor.

It has been conventional practice heretofore to prevent the entry of water into such a joint by calking the innermost portion of the joint with jute or hemp. However, this method is characterized by numerous disadvantages and difficulties. From the mechanical standpoint, care must be taken that the calking is of uniform thickness between the spigot and bell ends of adjoining pipe sections in order that the sections be concentrically aligned. Furthermore, the depth of the calking within the joint must be uniform so that the lead seal will have a uniform depth within the joint for otherwise an uneven lead seal, or the like, produces uneven stresses within the joint under varying temperature conditions with the resulting likelihood that the pipe will be broken at the joint. A substantial excavation, known as a bell-hole, must also be provided underneath the joint to provide room for a workman to calk the underneath section of the joint. From the non-mechanical standpoint, the conventional calking process is disadvantageous because the abutment of adjoining pipe sections permits the unhindered flow therethrough of electric currents induced in the pipe sections by external electrical equipment such as electric street-cars, electric conductors, and the like. This flow of current to, through and from metal pipe sections effects by electrolysis a flaking off and pitting of the metal pipe sections with the resulting formation of holes in the pipe sections over a prolonged period of time. Recent investigations have shown, moreover, that jute or hemp contain bacteria, and act as a breeding ground for bacteria, with resulting contamination of water flowing through a pipe calked in this manner.

I have devised a bone-dry packing device which insures complete freedom from moisture within the joints of water mains, and the like, and which overcomes the above-noted disadvantages of the conventional calking operation. This device comprises a hollow annular sleeve of flexible material capable of being inflated. The sleeve is provided with an inflation valve positioned in one edge of the sleeve and is provided with advantage with a radial shoulder adjacent the other edge of the annular sleeve projecting inwardly toward the axis of the sleeve. The inflation valve is so positioned in one edge of the hollow annular sleeve as to project into the interior of the hollow sleeve with only a limited portion of the valve extending exteriorly of this edge of the sleeve. This construction is provided with advantage by a tubular element projecting from one edge of the sleeve into the interior thereof with an inflation valve positioned within this tubular element and sealed in contact with the interior thereof. In the now-preferred embodiment of my invention the inflation valve is positioned in one edge of the hollow annular sleeve by means of an inflation valve assembly which comprises a tubular inflation valve and an inflation valve receptacle of flexible material, the valve receptacle comprising a tubular portion provided near one end thereof with a flange portion extending radially outwardly from the tubular portion. The tubular inflation valve is sealed in contact with the interior of the tubular portion of the valve receptacle, and the flange portion of the valve receptacle is sealed in contact with the edge of the hollow annuluar sleeve with the tubular portion of the valve receptacle projecting into the interior of the hollow sleeve.

The novel packing device of my invention will be more fully understood upon reference to the drawing in which:

Fig. 1 is a plan view of the valve assembly;

Fig. 2 is a sectional elevation of the valve assembly;

Fig. 3 is a plan view of a section of the packing device of my invention showing that portion of the sleeve where the valve receptacle is sealed in contact with the sleeve;

Fig. 4 is a vertical cross-section along line 4—4 in Fig. 3;

Fig. 5 is a cross-sectional view showing the installation of the valve assembly in that portion of the hollow sleeve shown in Figs. 3 and 4;

Fig. 6 is a plan view of the portion of the hollow sleeve shown in Figs. 3 and 5 and shows the valve assembly sealed in contact therewith;

Fig. 7 is a side view of the sleeve and valve assembly shown in Figs. 5 and 6;

Fig. 8 is a cross sectional view of adjoining spigot and bell ends of adjoining water main pipe sections showing the installation of the packing device of my invention;

Fig. 9 is a cross-sectional view of the joint between adjoining spigot and bell ends of adjoining water main pipe sections provided with a modified form of my packing device; and Fig. 10 is a sectional elevation of a modified form of valve assembly.

The novel packing device of my invention shown in cross-section in Fig. 8 comprises a hollow annular sleeve 10 of flexible material, such as rubber, capable of being inflated. An inflation valve 11 is positioned in one edge of the sleeve and projects into the interior of the hollow sleeve. The portion of the edge of the sleeve where the valve is positioned is provided with a cylindrical shoulder 12 as shown particularly in Figs. 3 and 4. The other edge of the annular sleeve 10 is provided with a radial shoulder 13 projecting inwardly toward the axis of the sleeve.

The inflation valve assembly, shown in detail in Figs. 1 and 2, comprises the tubular inflation valve 11, which may be of conventional design as shown in the drawing, inserted within the tubular portion 14 of the inflation valve receptacle. The relative position of the inflation valve within the tubular portion 14 of the valve receptacle is preferably such that only a limited portion of the inlet end of the valve projects beyond the tubular portion, as shown in Figs. 2, 5 and 7. However, the inlet end of the valve may be positioned flush with the end of the tubular portion 14, as shown in Fig. 10. The tubular portion of the valve receptacle is provided near one end thereof with a flange 15 of flexible material. The flange may be positioned either near the end of the tubular portion of the valve receptacle, as shown in Fig. 2 or at the extreme end thereof as shown in Fig. 10. The entire valve receptacle comprising the tubular portion 14 and the radial flange 15 may be formed integrally with advantage of rubber or similar composition. The tubular valve 11 is sealed within the tubular portion 14 of the valve receptacle by vulcanization, or the like, the bead 19 usually provided on the outer surface of conventional inflation valves aiding in providing an air-tight seal between the valve and the tubular portion 14.

The tubular portion 14 of the valve receptacle, as illustrated in the drawing with the valve assembly shown in Fig. 2, is positioned within the shoulder 12 on the edge of the hollow sleeve with the tubular portion 14 and the valve 11 projecting within the interior of the hollow sleeve as shown in Fig. 5. The radial flange 15 of the valve receptacle is sealed in contact with the edge of the annular sleeve and over the shoulder 12 as shown in Figs. 5 through 7. This construction provides an air-tight installation of the inflation valve in the edge of the annular sleeve. Increasing air pressure within the hollow sleeve compresses the tubular portion 14 of the valve receptacle around the tubular valve 11 and insures an air-tight seal in spite of any tendency for that portion of the sleeve around the shoulder 12 to expand when the sleeve is inflated.

The packing device of my invention is used as follows in sealing a water main or the like. The annular inflatable sleeve 10 is placed on the spigot end 16 of a pipe section with the radial shoulder 13 adjacent one edge of the sleeve abutting the open end of the pipe section. The pipe section with the inflatable ring positioned at the end of the pipe is then inserted as far as possible into the mouth of the bell-shaped end 17 of the adjoining pipe section. The radial shoulder 13 holds the annular sleeve 10 in position on the spigot end 16 of the pipe section being inserted into the bell-shaped section and further provides a buffer between the adjoining pipe sections which will absorb road shock when the water main is completed. A suitable extension device is secured to the end of the inflation valve 11 for connecting the valve to a supply of compressed air and the ring is inflated with air to a pressure of say 25 pounds per square inch, although lower and higher pressures may be used with advantage. The extension device may be attached to the external or internal threads of the conventional type inflation valve in the assembly shown in Figs. 2, 5 and 7 or to the internal threads of the valve in the assembly shown in Fig. 10. Inflation of the annular sleeve 10 contributes to aligning the adjoining pipe sections concentrically and insures effective sealing of the joint between the spigot end 16 and the bell end 17 against leakage during subsequent operations. The extension device is then disconnected from the inflation valve, any moisture that is present is removed from the inner surfaces of the joint exteriorly of the annular sleeve 10, and the void left in the joint is filled with molten lead or other non-calking fusible material 18 as shown in Figs. 8 and 9. The joint is permanently sealed as soon as the fusible material has completely hardened. The sealing material flowing into and solidifying within the joint fills the lead-lock 20 which is conventionally provided in the bell ends of water main pipe sections.

The modified form of packing device shown in Fig. 9 is similar to that shown in Fig. 8 but differs therefrom in that the portion of the annular sleeve 10 adjacent the radial shoulder 13 is provided with a groove 21 on the inner surface of the sleeve forming an annular recess in the inner surface of the sleeve. This annular groove or recess is adapted to accommodate the bead 22 which is frequently provided at the extreme of the spigot end 16 of standard water main pipe sections.

The packing device of my invention reduces to an important extent the time required heretofore for the sealing of joints in a water main, or the like. The packing device insures the absence of all moisture from the joint and maintains the joint bone-dry during the sealing operation. Moreover, the packing device of this invention eliminates the necessity for calking and thereby eliminates the necessity for a bell-hole beneath the joint being sealed. Inflation of the packing device assists materially the aligning of adjoining pipe sections, and by eliminating the necessity of using jute or hemp, as in conventional practice heretofore, a more sanitary joint is provided. The radial shoulder of the packing device disposed between abutting ends of adjoining pipe sections absorbs road shock to an important extent. When non-metallic fusible sealing materials are used for sealing the joint the radial shoulder insulates adjoining pipe sections from one another and thereby eliminates electrolysis with its concomitant disadvantages.

I claim:

1. A packing device comprising a hollow annular sleeve of flexible material capable of being inflated, the sleeve having a larger dimension longitudinally of its side walls than the thickness of the sleeve, an inflation valve positioned in one edge wall of the sleeve and projecting into the interior of the hollow sleeve with only a minor portion of the valve extending exteriorly of said edge of the sleeve, and a radial shoulder adjacent the other edge wall of the sleeve projecting inwardly toward the axis of the sleeve.

2. A packing device comprising a hollow annular sleeve of flexible material capable of being inflated, the sleeve being provided with a tubular portion projecting from one edge wall thereof into the interior of the hollow sleeve, and an inflation valve positioned within said tubular portion and bonded to the interior of said tubular portion.

3. A packing device comprising a hollow annular sleeve of flexible material capable of being inflated, a tubular inflation valve receptacle of flexible material mounted in an opening in one edge wall of the sleeve and projecting within the interior of the sleeve, the tubular receptacle having a flange extending radially outwardly therefrom and bonded to said edge wall of the sleeve, and a tubular inflation valve projecting a substantial distance within the interior of the sleeve and bonded to the interior of the tubular receptacle.

4. A packing device comprising a hollow annular sleeve of flexible material capable of being inflated, a tubular inflation valve receptacle of flexible material mounted in an opening in one edge wall of the sleeve and projecting within the interior of the sleeve, the tubular receptacle having a flange extending radially outwardly therefrom and bonded to said edge wall of the sleeve, a tubular inflation valve projecting a substantial distance within the interior of the sleeve and bonded to the interior of the tubular receptacle, and a radial shoulder adjacent the other edge wall of the sleeve projecting inwardly toward the axis of the sleeve.

5. A sealed joint between adjoining sections of a pipe line comprising a spigot end of one section disposed within the bell end of the adjoining section, a hollow annular sleeve of flexible material adjacent the extremity of the spigot end and inflated to make contact between the spigot end and bell end of the adjoining sections, the sleeve having an inflation valve positioned in one edge wall of the sleeve and projecting into the interior of the sleeve, and a sealing medium filling substantially the remaining space between the spigot end and the bell end of the adjoining sections and covering and sealing the portion of the inflation valve extending exteriorly of the sleeve.

6. A sealed joint between adjoining sections of a pipe line comprising a spigot end of one section disposed within the bell end of the adjoining section, a hollow annular sleeve of flexible material adjacent the extremity of the spigot end and inflated to make contact between the spigot end and bell end of the adjoining sections, the sleeve having an inflation valve positioned in one edge wall of the sleeve and projecting into the interior of the sleeve, the sleeve being provided with a radial shoulder adjacent the other edge wall thereof projecting inwardly toward the axis of the sleeve and over the extremity of the spigot end, and a sealing medium filling substantially the remaining space between the spigot end and the bell end of the adjoining sections and covering and sealing the portion of the inflation valve extending exteriorly of the sleeve.

THOMAS S. MILLER.